(12) United States Patent
Journade et al.

(10) Patent No.: US 12,741,748 B2
(45) Date of Patent: Sep. 22, 2026

(54) AIRCRAFT COMPRISING AT LEAST ONE ENGINE ATTACHMENT SYSTEM WHICH HAS COPLANAR ANCHORING POINTS ON THE ENGINE

(71) Applicant: Airbus Operations (S.A.S.), Toulouse (FR)

(72) Inventors: Frederic Journade, Toulouse (FR); Olivier Pautis, Toulouse (FR); Jérôme Colmagro, Toulouse (FR); Germain Gueneau, Toulouse (FR); Pierre-Antoine Combes, Toulouse (FR); Marc De Nicola, Toulouse (FR); Fabrice Grimal, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 19/038,860

(22) Filed: Jan. 28, 2025

(65) Prior Publication Data

US 2025/0250018 A1 Aug. 7, 2025

(30) Foreign Application Priority Data

Jan. 29, 2024 (FR) ....................................... 2400858

(51) Int. Cl.
*B64D 27/40* (2024.01)

(52) U.S. Cl.
CPC .................................. *B64D 27/40* (2024.01)

(58) Field of Classification Search
CPC .... B64D 27/40; B64D 27/402; B64D 27/404; B64D 27/406; F01D 25/28; F02C 7/20
See application file for complete search history.

(56) References Cited

U.S. PATENT DOCUMENTS 4,997,145 A * 3/1991 Hodgkinson .......... B64D 27/18 244/54
8,382,031 B2 2/2013 Dussol
11,760,498 B2 * 9/2023 Gormley .............. B64D 27/406 244/54
2017/0043878 A1 2/2017 Pautis
2022/0055758 A1 * 2/2022 Berjot ..................... B64D 27/18
2025/0010998 A1 * 1/2025 Combes ................. B64D 27/18

FOREIGN PATENT DOCUMENTS

EP 4112476 A1 * 1/2023 ............ B64D 27/34

* cited by examiner

*Primary Examiner* — Alentina Xavier
(74) *Attorney, Agent, or Firm* — KDW Firm PLLC

(57) ABSTRACT

An aircraft including at least one engine attachment system, connecting an engine and a primary structure, which includes a central body and at least first right and left extensions positioned on either side of the central body in a first transverse plane, connected to the latter and stiffened by other right and left extensions and reinforcements. The engine attachment system includes at least three connections each including an anchoring point rigidly secured to the engine, the anchoring points of the various connections being located approximately in the same transverse plane. This solution makes it possible to reduce stresses in the engine, in particular torsional and/or bending stresses, produced as a result of the transfer of the forces between the engine and the primary structure.

19 Claims, 17 Drawing Sheets

AIRCRAFT COMPRISING AT LEAST ONE ENGINE ATTACHMENT SYSTEM WHICH HAS COPLANAR ANCHORING POINTS ON THE ENGINE

TECHNICAL FIELD

The present application relates to an aircraft comprising at least one engine attachment system which has coplanar anchoring points on the engine.

BACKGROUND

According to an embodiment shown in FIGS. 1 and 2, an aircraft 10 comprises a propulsion unit 12 positioned under each of the wings 14 of the aircraft. Each propulsion unit 12 comprises an engine 16, a nacelle (not shown in FIG. 2) positioned around the engine 16 and a pylon 18 connecting the engine 16 and the wing 14. The pylon 18 comprises a primary structure 20 which is connected to the engine 16 by an engine attachment system 22 and to the wing 14 by an airfoil attachment system 24.

According to an embodiment, the engine 16 comprises a substantially cylindrical fan casing 16.1 and a jet engine hub 16.2 which extends between front and rear ends and has an axis of rotation corresponding to the axis of rotation A16 of the engine 16.

For the disclosure herein, a longitudinal direction X is substantially parallel to the axis of rotation A16 of the engine 16. A vertical median plane PMV is a vertical plane passing through the axis of rotation A16. A transverse plane is a plane perpendicular to the axis of rotation A16. A horizontal transverse direction Y is a horizontal direction perpendicular to the axis of rotation A16. A vertical direction is denoted Z in the various figures. The terms front/rear refer to the direction of flow of the air streams flowing in the longitudinal direction X, from the front to the rear.

According to an embodiment, the primary structure 20 of the pylon is a hollow box structure comprising an upper longeron 20.1, a lower longeron 20.2, intermediate reinforcements arranged in transverse planes, a front reinforcement 20.3 which connects the front ends of the upper and lower longerons 20.1, 20.2, a rear reinforcement 20.4 which connects the rear ends of the upper and lower longerons 20.1, 20.2 and lateral panels 20.5 arranged on either side of the intermediate reinforcements.

The engine attachment system 22 comprises a front engine attachment system 26, a rear engine attachment system 28 and a pair of connecting rods 30 for take-up of the thrust forces of the engine 16.

According to an embodiment, the front engine attachment system 26 comprises a first anchoring point rigidly secured to the front reinforcement 20.3 of the primary structure 20 of the pylon 18 and a second anchoring point rigidly secured to the fan casing 16.1 or to the jet engine hub 16.2 and positioned in a first transverse plane P1. According to other embodiments, the front engine attachment system 26 comprises a first anchoring point rigidly secured to the front reinforcement 20.3 of the primary structure 20 of the pylon 18 and second and third anchoring points rigidly secured to the fan casing 16.1 or to the jet engine hub 16.2 and positioned in a first transverse plane P1. These second and third anchoring points are generally spaced not very far apart.

According to an embodiment visible in FIG. 3, the rear engine attachment system 28 comprises a transverse beam 32, under the primary structure 20, connected to the latter by connection elements 34 (depicted schematically in the form of axis lines). In addition, the rear engine attachment system 28 comprises:

a first L-shaped bracket 36 which has a first end 36.1, a second end 36.2 and an intermediate zone 36.3,
 a. a first engine connection pin 38 connecting the first end 36.1 of the first bracket 36 and the engine 16,
 b. a first beam connection pin 40 connecting the second end 36.2 of the first bracket 36 and the transverse beam 32,
 c. a second beam connection pin 42 connecting the intermediate zone 36.3 of the first bracket 36 and the transverse beam 32;

a second bracket 44 which has first and second ends 44.1, 44.2,
 a. a second engine connection pin 46 connecting the first end 44.1 of the second bracket 44 and the engine 16,
 b. a third beam connection pin 48 connecting the second end 44.2 of the second bracket 44 and the transverse beam 32;

an emergency connection pin 50, directly connecting the transverse beam 32 and the engine 16 in the event of failure of one of the two brackets 36, 44.

According to this embodiment, the first and second engine connection pins 38, 46 and the emergency connection pin 50 are connected to anchoring points, rigidly secured to the engine 16, positioned approximately in a second transverse plane P2 offset in the longitudinal direction towards the rear relative to the first transverse plane P1.

Even though the first and second brackets 36, 44 make it possible to increase the distance which separates the first and second engine connection pins 38, 46, the latter cannot be spaced apart by a very large angle $\alpha$.

According to an embodiment visible in FIG. 2, each connecting rod 30 has a first end 30.1, rigidly secured to the primary structure 20, located in the vicinity of the rear engine attachment system 28 and a second end 30.2, connected to an anchoring point rigidly secured to the jet engine hub 16.2, located in a third transverse plane P3 offset in the longitudinal direction towards the front relative to the second transverse plane P2 and towards the rear relative to the first transverse plane P1.

Consequently, the engine attachment system 22 comprises several anchoring points on the engine 16, distributed in several transverse planes P1, P2, P3 offset in the longitudinal direction. Furthermore, the engine 16 must be configured to withstand certain stresses, such as torsional and/or bending stresses for example, generated by the transmission of forces between the engine 16 and the primary structure 20 of the pylon at several anchoring points positioned in several transverse planes P1, P2, P3 offset in the longitudinal direction, and to ensure the transmission of forces between the engine 16 and the engine attachment system 22 in line with these various anchoring points positioned in several transverse planes, which tend to complicate the design of the engine 16.

The disclosure herein aims to overcome all or some of the drawbacks of the prior art.

SUMMARY

To this end, the disclosure herein relates to an aircraft comprising at least one propulsion unit comprising an engine which has an engine axis as well as vertical and horizontal median planes passing through the engine axis, at least one primary structure of a pylon and at least one engine attachment system connecting the engine and the primary structure, the engine comprising a fan casing and a jet engine hub.

According to the disclosure herein, the primary structure comprises a central body, at least first and second right and left extensions positioned on either side of the central body and connected to the latter, at least one right reinforcement connecting the first and second right extensions and at least one left reinforcement connecting the first and second left extensions, the first right and left extensions being offset towards the front in a longitudinal direction parallel to the axis of the engine relative to the second right and left extensions and positioned substantially in a first transverse plane. In addition, the engine attachment system comprises at least three connections each comprising a first anchoring point rigidly secured to the primary structure, a second anchoring point rigidly secured to the engine and an articulation connecting the first and second anchoring points, at least two first anchoring points being rigidly secured to the first right and left extensions, the second anchoring points being located approximately in the same second transverse plane.

Positioning the second anchoring points in the same transverse plane tends to reduce the stresses in the engine, in particular torsional and/or bending stresses, generated as a result of the transfer of the forces between the engine and the primary structure. Thus, it is potentially possible to simplify the design of the engine, and improve its performance by optimizing the transfers of the forces in the structural frame of the engine. This also makes it possible to optimize the overall weight of the engine and the management of play between rotary elements and fixed elements.

According to another feature, the connections of the engine attachment system are arranged symmetrically relative to the vertical median plane and have first anchoring points rigidly secured to the first right and left extensions.

According to another feature, the engine attachment system comprises first, second, third and fourth connections, the first and second connections being positioned on either side of the vertical median plane, approximately in the horizontal median plane.

According to another feature, the third and fourth connections are positioned on either side of the vertical median plane, in planes which form with the vertical median plane an angle of between 25 and 65°.

According to another feature, the engine attachment system comprises a fifth connection positioned in the vertical median plane, under the engine.

According to another feature, the articulation of each of the connections of the engine attachment system is configured to take up the forces in three orthogonal directions.

According to another feature, the articulation of each of the connections of the engine attachment system is a ball joint.

According to another feature, on either side of the vertical median plane, the first and second right or left extensions are connected by at least one first substantially horizontal reinforcement positioned approximately in the horizontal median plane and by a second oblique reinforcement which has a front end connected to the first right or left extension and a rear end connected to the second right or left extension closer to the central body than the front end.

According to another feature, on either side of the vertical median plane, the first and second right or left extensions are connected by two first substantially horizontal reinforcements, one positioned in the horizontal median plane and another offset downwards relative to the horizontal median plane.

According to another feature, the primary structure comprises third right and left extensions positioned on either side of the central body, offset towards the rear relative to the second right and left extensions, at least one third right reinforcement connecting the second and third right extensions and at least one third left reinforcement connecting the second and third left extensions.

According to another feature, the primary structure comprises, on either side of the vertical median plane, at least one third oblique reinforcement having a front end connected to the second right or left extension and a rear end connected to the third right or left extension closer to the central body than the front end.

According to another feature, the primary structure comprises, on either side of the vertical median plane, as many third oblique reinforcement(s) as there are first horizontal reinforcement(s), the front end of each third oblique reinforcement being positioned in the extension of a first horizontal reinforcement.

According to another feature, the first right and left extensions are connected to one another and form a first support positioned approximately in the first transverse plane and/or the second right and left extensions are connected to one another and form a second support positioned approximately in a transverse plane and/or the third right and left extensions are connected to one another and form a third support positioned approximately in a transverse plane.

According to another feature, at least one of the first and second supports has approximately a horseshoe or inverted U shape.

According to another feature, at least one of the first and second supports has an approximately annular shape configured to surround the engine.

According to another feature, each of the first and second supports comprises several parts connected to one another removably so as to be able to position the engine in the annular shape.

According to a first variant, all of the second anchoring points are rigidly secured to the fan casing.

According to a second variant, all of the second anchoring points are rigidly secured to the jet engine hub.

According to another feature, the engine attachment system comprises main connections positioned in the second transverse plane and configured to ensure transmission of the main forces between the engine and the primary structure and at least one secondary connection configured to ensure take-up of the forces between the engine and the primary structure in the event of rupture of or damage to at least one of the main connections and/or ensure transmission of weaker secondary forces between the engine and the primary structure during normal operation.

BRIEF DESCRIPTION OF THE DRAWINGS

Further features and advantages will emerge from the description of the disclosure herein below, which is provided solely by way of example, with reference to the attached drawings in which.

DETAILED DESCRIPTION

Figure 1:
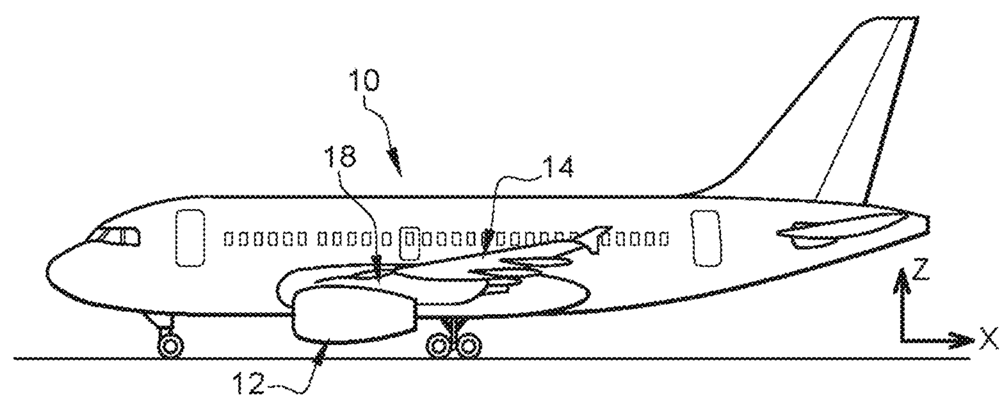
FIG. 1 is a side view of an aircraft.
Figure 2:
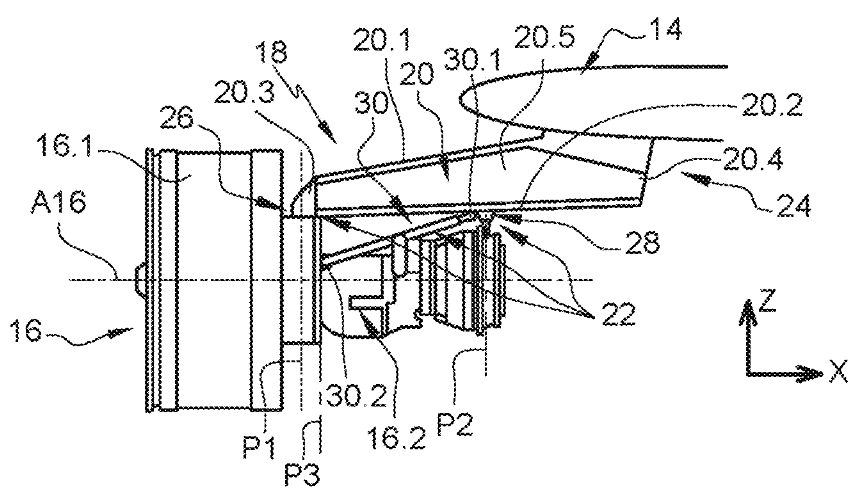
FIG. 2 is a side view of an engine (without the nacelle) depicting an embodiment of the prior art.
Figure 3:
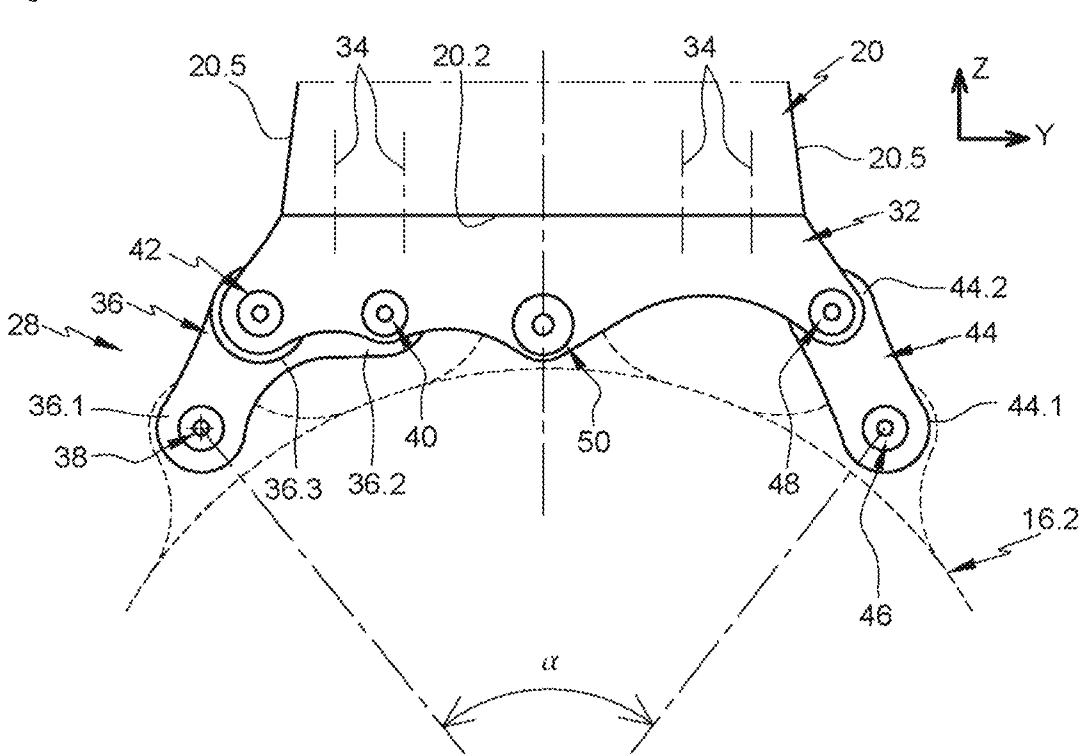
FIG. 3 is an end-on view of a rear engine attachment which depicts an embodiment of the prior art.
Figure 4:
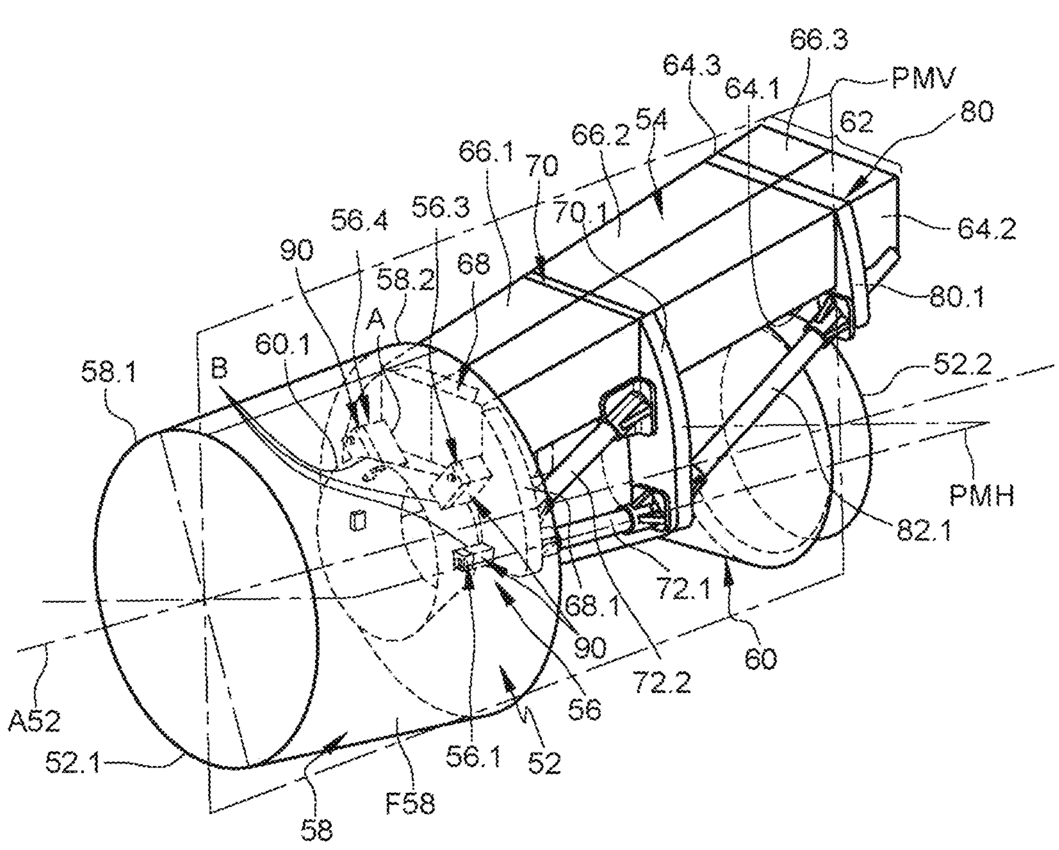
FIG. 4 is a perspective view of an engine, a pylon and an engine attachment system depicting a first embodiment of the disclosure herein.

An aircraft comprises at least one airfoil and at least one propulsion unit connected to the airfoil by a pylon.

According to embodiments visible in FIGS. 4, 5, 9, 10, 14 to 17, each propulsion unit comprises an engine 52 and a nacelle (not shown) positioned around the engine 52. In addition, the pylon comprises a primary structure 54 connected to the engine 52 by an engine attachment system 56 and to the airfoil by an airfoil attachment system (not shown) and a fairing surrounding the primary structure 54 between the nacelle of the engine 52 and the airfoil.

The engine 52 extends between front and rear ends 52.1, 52.2 and comprises a substantially cylindrical fan casing 58 which extends between front and rear ends 58.1, 58.2, positioned respectively in front and rear transverse planes, and a jet engine hub 60 which extends between front and rear ends and has an engine axis A52. According to one configuration, the jet engine hub 60 comprises a tubular wall 60.1, cylindrical or frustoconical, positioned inside the fan casing 58 and in the vicinity of or in the rear transverse plane of the fan casing 58. The fan casing 58 has an inner surface oriented towards the jet engine hub 60 and an outer surface F58 opposite the inner surface.

The engine 52 has a horizontal median plane PMH (referenced in FIGS. 4 and 5) which passes through the engine axis A52.

According to an embodiment, the primary structure 54 comprises a central body 62 which extends between front and rear ends and has a lower face 64.1 oriented towards the engine 52 and right and left lateral faces 64.2, 64.3. According to one configuration, the lower and lateral faces 64.1, 64.2, 64.3 are approximately flat and the central body 62 has square or rectangular cross sections. Naturally, the disclosure herein is not limited to these cross sections for the central body 62. Other cross sections may be envisaged. Generally, the central body 62 has cross sections which increase from the front end towards the rear end.

According to one arrangement, the primary structure 54 is substantially symmetrical relative to a vertical median plane PMV passing through the engine axis A52.

According to an embodiment, the central body 62 comprises several portions 66.1, 66.2, 66.3 offset from one another in the longitudinal direction. Each portion 66.1, 66.2, 66.3 has a hollow box structure.

According to one feature of the disclosure herein, the primary structure 54 comprises at least first and second right extensions 68.1, 70.1 connected to the central body 62, offset relative to one another in the longitudinal direction and connected to one another by at least one right reinforcement 72.1, 72.2 and at least first and second left extensions 68.2, 70.2 connected to the central body 62, offset relative to one another in the longitudinal direction and connected to one another by at least one left reinforcement. Each of the first and second right extensions 68.1, 70.1 comprises at least one right portion further away from the vertical median plane PMV than the right lateral face 64.2 of the central body 62 and offset downwards relative to the lower face 64.1. Each of the first and second left extensions 68.2, 70.2 comprises at least one left portion further away from the vertical median plane PMV than the left lateral face 64.3 of the central body 62 and offset downwards relative to the lower face 64.1.

The right portions of the first and second right extensions 68.1, 70.1 on the one hand and the left portions of the first and second left extensions 68.2, 70.2 on the other hand are positioned on either side of the engine 52.

The central body 62, the first and second right and left extensions 68.1, 68.2, 70.1, 70.2 and the right and left reinforcements 72.1, 72.2 form a rigid structure.

According to one arrangement, the first right and left extensions 68.1, 68.2 are positioned in a first transverse plane. They are substantially symmetrical relative to the vertical median plane PMV. According to one configuration, the first right and left extensions 68.1, 68.2 are connected to one another and form a first support 68 (one-piece) positioned approximately in the first transverse plane.

According to one arrangement, the second right and left extensions 70.1, 70.2 are positioned in a transverse plane. They are substantially symmetrical relative to the vertical median plane PMV. According to one configuration, the second right and left extensions 70.1, 70.2 are connected to one another and form a second support 70 (one-piece) positioned approximately in a transverse plane.

According to embodiments visible in FIGS. 4 to 8, 14 and 15, at least one of the first and second supports 68, 70 has approximately a horseshoe or inverted U shape.

According to other embodiments visible in FIGS. 9 to 12, 16 and 17, at least one of the first and second supports 68, 70 has an approximately annular shape configured to surround the engine 52. According to one configuration visible in particular in FIGS. 11 and 12, each of the first and second supports 68, 70 comprises several parts 74, 76 connected to one another removably so as to be able to position the engine 52 in the annular shape. According to one arrangement, each of the first and second supports 68, 70 of annular shape comprises upper and lower parts 74, 76, the upper part 74 being connected to the central body 62, and having first and second ends 74.1, 74.2 positioned approximately in a horizontal plane, slightly offset downwards relative to the horizontal median plane PMH, the lower part 76 having first and second ends 76.1, 76.2 connected respectively to the first and second ends 74.1, 74.2 of the upper part 74 by removable connection elements 78. Each of the upper and lower parts 74, 76 extends approximately over a section of a circle or a half-circle. The fact that it is possible to assemble and dismantle the various parts 74, 76 of the first and second supports 68, 70 makes it possible to position each of them around the engine 52. Naturally, the disclosure herein is not limited to this number of parts 74, 76 or to these shapes for the parts 74, 76.

On either side of the vertical median plane PMV, the first and second right or left extensions 68.1, 68.2, 70.1, 70.2 are connected by at least one first substantially horizontal right or left reinforcement 72.1, positioned approximately in the horizontal median plane PMH.

According to embodiments visible in FIGS. 4 to 8, 14 and 15, on either side of the vertical median plane PMV, the first and second right or left extensions 68.1, 68.2, 70.1, 70.2 are connected by a first substantially horizontal reinforcement 72.1, positioned approximately in the horizontal median plane PMH, and by a second oblique reinforcement 72.2 which has a front end **72.2*a* connected to the first right or left extension 68.1, 68.2 and a rear end 72.2*b* connected to the second right or left extension 70.1, 70.2 closer to the central body 62 than the front end. According to one arrangement, for each second oblique reinforcement 72.2, the front end 72.2*a* adjoins the first horizontal reinforcement 72.1 and the rear end 72.2*b* adjoins the central body 62**.

According to embodiments visible in FIGS. 9 to 12, 16 and 17, on either side of the vertical median plane PMV, the first and second right or left extensions 68.1, 68.2, 70.1, 70.2 are connected by two first substantially horizontal reinforcements 72.1, 72.1', one positioned in the horizontal median plane PMH and another offset downwards relative to the horizontal median plane PMH, and by a second oblique reinforcement 72.2 which has a front end **72.2*a* connected to the first right or left extension 68.1, 68.2 and a rear end 72.2*b* connected to the second right or left extension 70.1, 70.2 closer to the central body 62 than the front end 72.2*a*. According to one arrangement, for each second oblique reinforcement 72.2, the front end 72.2*a* adjoins the first reinforcement 72.1 located in the horizontal median plane and the rear end 72.2*b* adjoins the central body 62**.

To reinforce the rigidity of the primary structure 54 and ensure better transmission of the forces between the engine 52 and the primary structure 54, the latter comprises third right and left extensions 80.1, 80.2 positioned on either side of the central body 62 and offset towards the rear relative to the second right and left extensions 70.1, 70.2, at least one third right reinforcement 82.1, 82.2 connecting the second and third right extensions 70.1, 80.1 and at least one third left reinforcement connecting the second and third left extensions 70.2, 80.2. Even when there is a third support 80, the majority of the forces and the stresses travel to the central body 62 via the first and second supports 68, 70. Only the inertial loads of the engine 52 travel via the third support 80.

According to one configuration, the third right and left extensions 80.1, 80.2 are positioned in a transverse plane. They are substantially symmetrical relative to the vertical median plane PMV. According to one configuration, the third right and left extensions 80.1, 80.2 are connected to one another and form a third support 80 positioned approximately in a transverse plane. According to an embodiment, the third support 80 has a horseshoe or inverted U shape.

According to a first arrangement visible in FIGS. 4 to 8, 14 and 15, the second and third right extensions 70.1, 80.1 are connected by a third oblique right reinforcement 82.1. In addition, the second and third left extensions 70.2, 80.2 are connected by a third oblique left reinforcement. Each of the third right and left reinforcements 82.1 has a front end connected to the second right or left extension 70.1, 70.2 and a rear end connected to the third right or left extension 80.1, 80.2 closer to the central body 62 than the front end. The front end of each third right or left reinforcement 82.1 is positioned in the extension of the first horizontal reinforcement 72.1 connecting the first and second right or left extensions (approximately in the same horizontal plane as the first reinforcement 72.1).

According to a second arrangement visible in FIGS. 9 to 12, 16 and 17, the second and third right extensions 70.1, 80.1 are connected by third and fourth oblique right reinforcements 82.1, 82.2. In addition, the second and third left extensions 70.2, 80.2 are connected by third and fourth oblique left reinforcements. Each of the third and fourth right and left reinforcements 82.1, 82.2 has a front end connected to the second right or left extension 70.1, 70.2 and a rear end connected to the third right or left extension 80.1, 80.2 closer to the central body 62 than the front end. On either side of the vertical median plane PMV, the front ends of the third and fourth reinforcements 82.1, 82.2 are positioned in the extension of the two first horizontal reinforcements 72.1, 72.1' connecting the first and second right or left extensions.

Thus, the primary structure 54 comprises, on either side of the vertical median plane PMV, as many third oblique reinforcement(s) 82.1, 82.2 connecting the second and third right or left extensions 70.1, 70.2, 80.1, 80.2 as there are first horizontal reinforcement(s) 72.1, 72.1' connecting the first and second right or left extensions 68.1, 68.2, 70.1, 70.2, each third oblique reinforcement 82.1, 82.2 having a front end positioned in the extension of a first horizontal reinforcement 72.1, 72.1'.

According to the configurations, it is possible to provide reinforcements directly connecting at least one of the supports 68, 70, 80 and the central body 62. By way of example, the third support 80 is connected to the central body 62 by oblique right and left reinforcements 84 positioned symmetrically relative to the vertical median plane PMV.

According to embodiments visible in FIGS. 4, 5, 9, 10, 14 to 17, the primary structure 54 comprises alternating supports 68, 70, 80 and portions 66.1, 66.2, 66.3, the first support 68 being the part furthest towards the front of the primary structure 54.

Each of the extensions 68.1, 68.2, 70.1, 70.2, 80.1, 80.2 or each of the supports 68, 70, 80 or each of the parts 74, 76 of the supports 68, 70, 80 may comprise a sheet in a transverse plane, a stack of sheets positioned in transverse planes, a box structure or any other structure. Each of the supports 68, 70, 80 or each of the parts 74, 76 of the supports 68, 70, 80 may be made of metal or a composite.

Each of the first, second and third right and left extensions 68.1, 68.2, 70.1, 70.2, 80.1, 80.2 or each of the first, second and third supports 68, 70, 80 has a thickness (dimension measured in the longitudinal direction) which is relatively small in relation to the total length (dimension measured in the longitudinal direction, from the front end to the rear end, of the primary structure 54). To give an idea of magnitude, the thickness of each of the first, second and third right and left extensions 68.1, 68.2, 70.1, 70.2, 80.1, 80.2 or of each of the first, second and third supports 68, 70, 80 is less than 10%, preferably less than 5%, of the total length of the primary structure 54.

Figure 5:
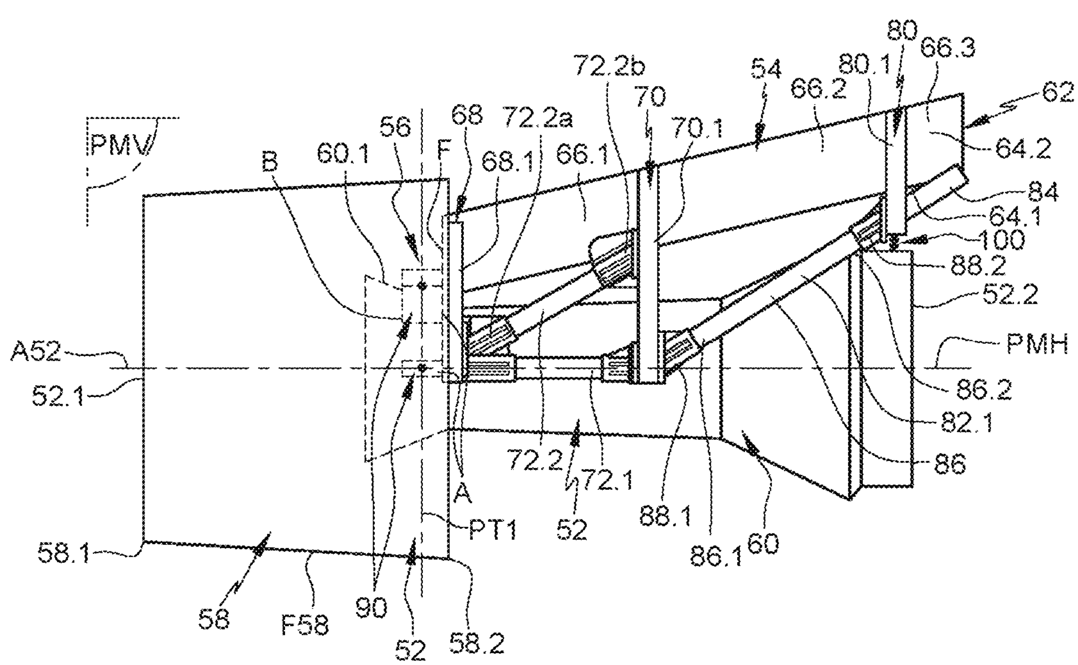
FIG. 5 is a side view of the engine, the pylon and the engine attachment system visible in FIG. 4.
Figure 6:
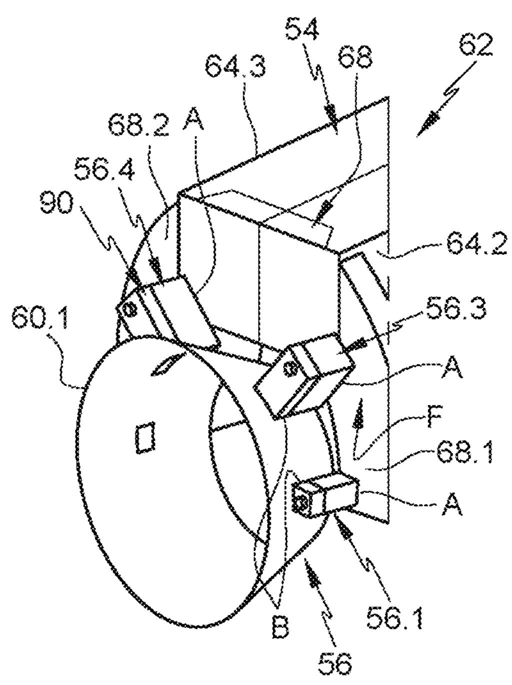
FIG. 6 is a perspective view of the engine attachment system visible in FIG. 4.

Each reinforcement 72.1, 72.1', 72.2, 82.1, 82.2, right or left, horizontal or oblique, comprises, as shown in FIG. 5, a hollow or solid cylindrical body 86, which has first and second ends 86.1, 86.2 and first and second endpieces 88.1, 88.2 positioned at the first and second ends 86.1, 86.2, respectively, of the cylindrical body 86. Each of the first and second endpieces comprises at least one plate, pressed against one of the supports 68, 70, 80 and/or the central body 62 and attached thereto, and a sleeve, connected to the plate(s), in which the cylindrical body 86 may be fitted. The cylindrical bodies 86 and the endpieces 88.1, 88.2 of the various reinforcements may be made of metal or a composite. Naturally, the disclosure herein is not limited to these embodiments for the reinforcements and for the connections provided between the reinforcements and the supports.

Naturally, the disclosure herein is not limited to these numbers of extensions, of supports 68, 70, 80 and of reinforcements or to these arrangements for the extensions, the supports and the reinforcements. Whatever the embodiment, the primary structure 54 comprises a central body 62, at least first and second right and left extensions 68.1, 68.2, 70.1, 70.2 positioned on either side of the central body 62 and connected to the latter, at least one right reinforcement 72.1, 72.2 connecting the first and second right extensions 68.1, 70.1 and at least one left reinforcement connecting the first and second left extensions 68.2, 70.2, the first right and left extensions 68.1, 68.2 being offset towards the front in the longitudinal direction relative to the second right and left extensions 70.1, 70.2 and substantially coplanar (positioned in the same transverse plane). According to a preferred configuration, the right extensions and reinforcement(s) and the left extensions and reinforcement(s) are arranged symmetrically relative to the vertical median plane PMV. The first right and left extensions 68.1, 68.2 have front faces F (oriented towards the front end 52.1 of the engine 52) which are substantially coplanar and positioned in a first transverse plane PT1, as shown in FIG. 5.

According to one feature of the disclosure herein, the engine attachment system 56 comprises at least three connections 56.1 to 56.3 each comprising a first anchoring point A rigidly secured to the primary structure 54, a second anchoring point B rigidly secured to the engine 52 and an articulation 90 connecting the first and second anchoring points A, B.

Figure 7:
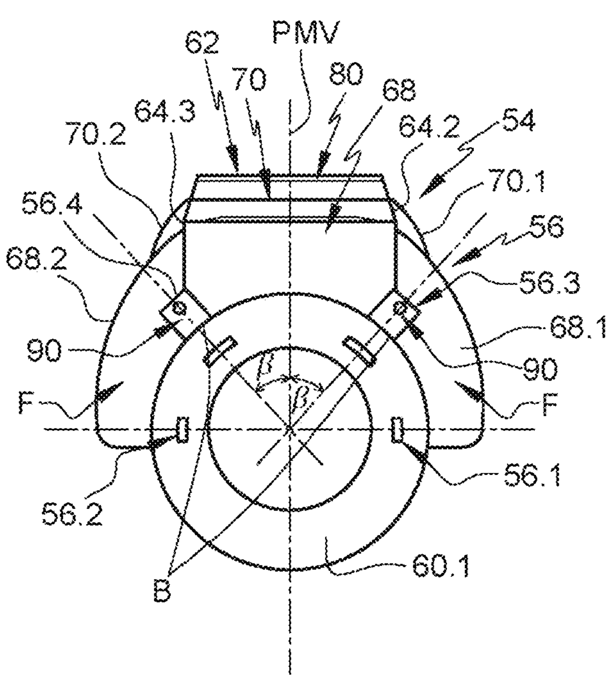
FIG. 7 is an end-on view of the engine attachment system visible in FIG. 4.
Figure 8:
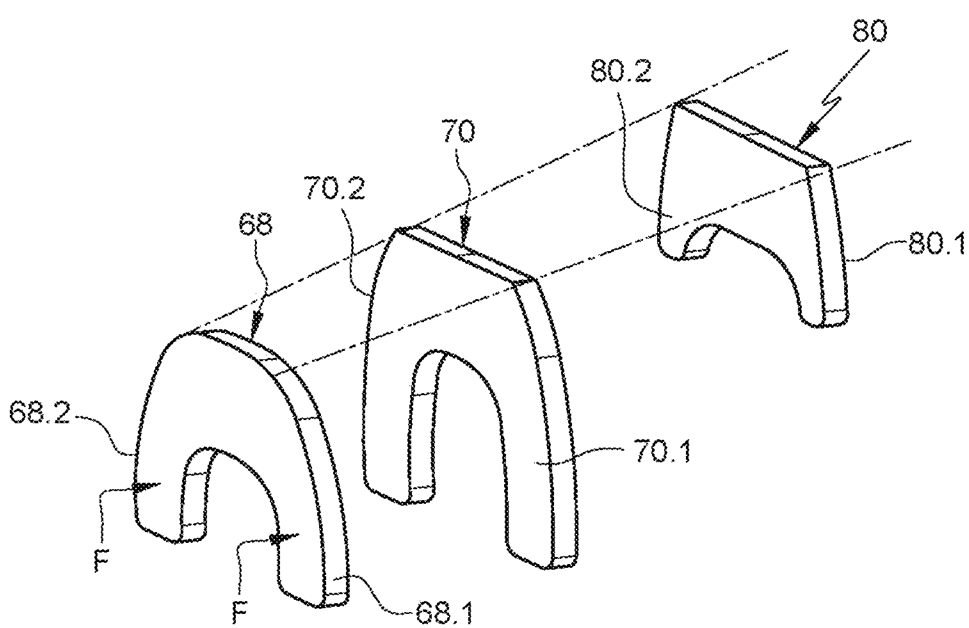
FIG. 8 is a perspective view of the supports of the primary structure of the pylon visible in FIG. 4.
Figure 9:
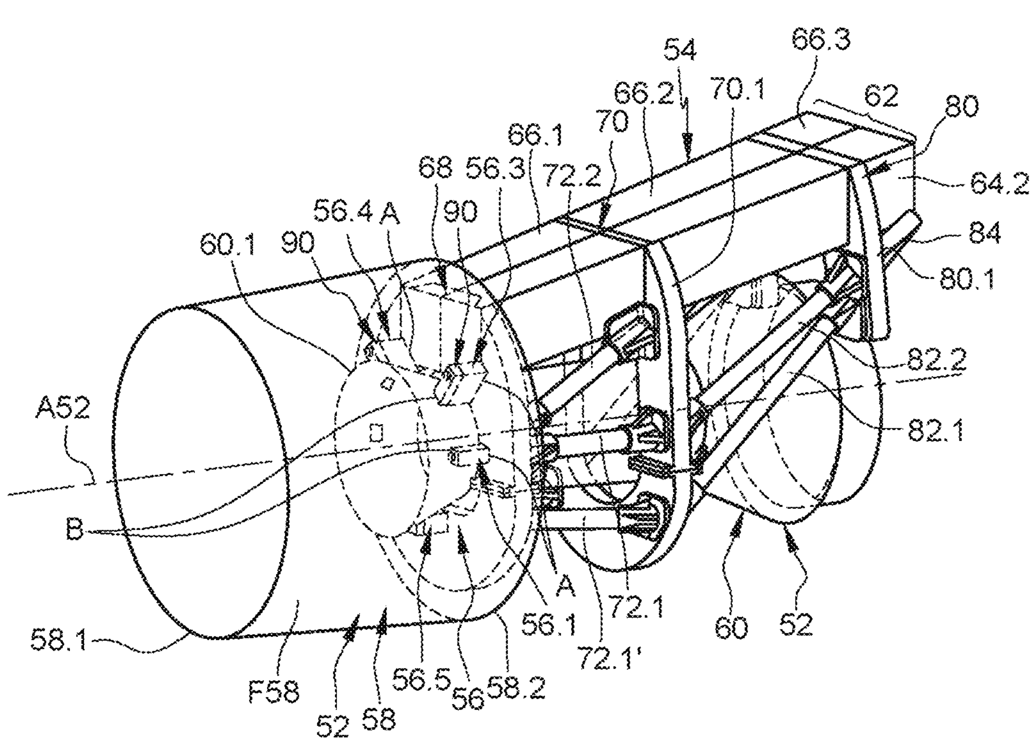
FIG. 9 is a perspective view of an engine, a pylon and an engine attachment system depicting a second embodiment of the disclosure herein.
Figure 10:
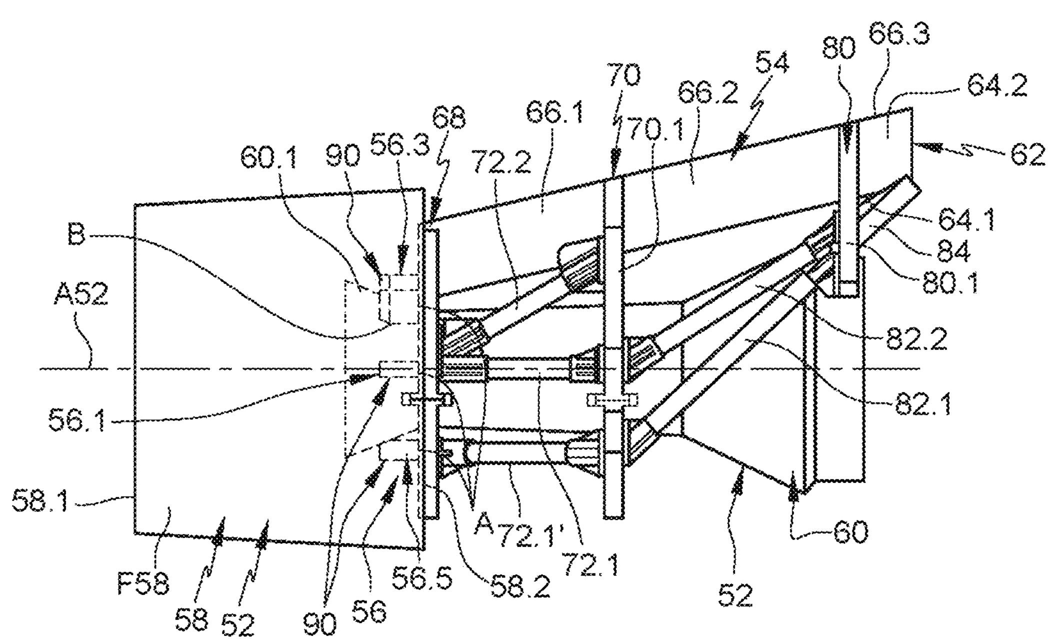
FIG. 10 is a side view of the engine, the pylon and the engine attachment system visible in FIG. 9.

According to embodiments visible in FIGS. 4 to 7, 14 and 15, the engine attachment system 56 comprises first, second, third and fourth connections 56.1 to 56.4 positioned symmetrically relative to the vertical median plane PMV. As shown in FIG. 7, the first and second connections 56.1, 56.2 are positioned on either side of the vertical median plane PMV, approximately in the horizontal median plane PMH, at 3 o'clock and 9 o'clock. The third and fourth connections 56.3, 56.4 are positioned on either side of the vertical median plane PMV, in planes which form with the vertical median plane PMV an angle β (visible in FIG. 7) of between 25 and 65°.

Figure 11:
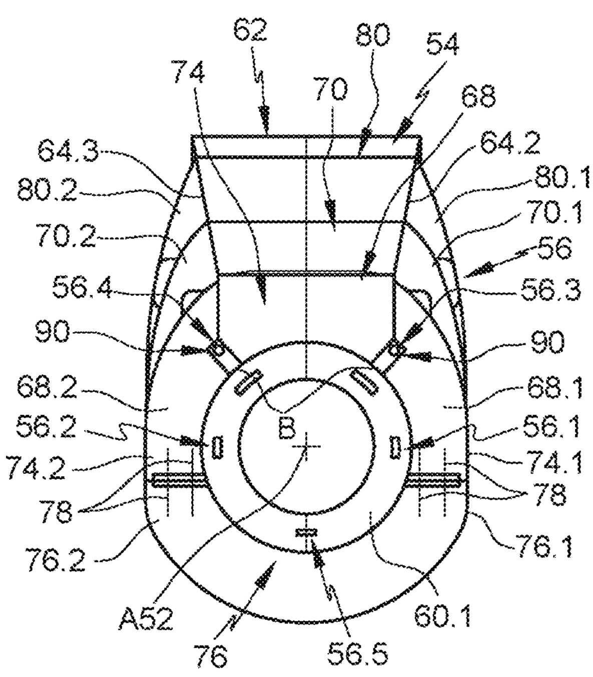
FIG. 11 is an end-on view of the engine attachment system visible in FIG. 9.
Figure 12:
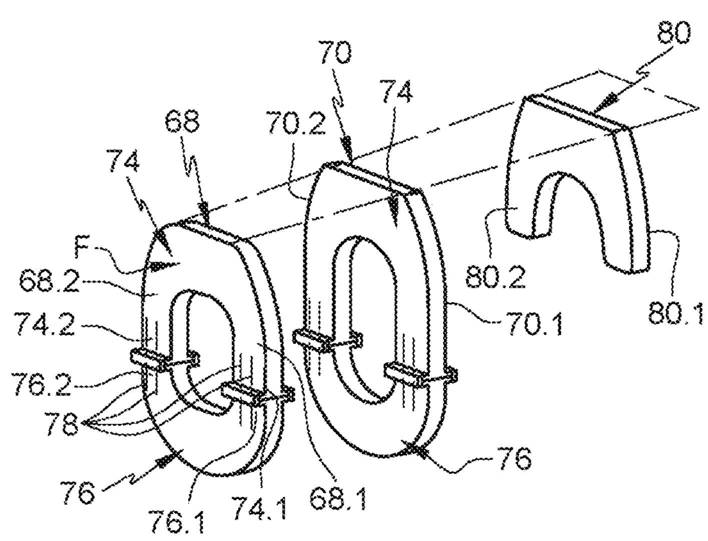
FIG. 12 is a perspective view of the supports of the primary structure of the pylon visible in FIG. 9.

According to other embodiments visible in FIGS. 9 to 11, 16 and 17, the engine attachment system 56 comprises first, second, third, fourth and fifth connections 56.1 to 56.5 positioned symmetrically relative to the vertical median plane PMV. As shown in FIG. 11, the first and second connections 56.1, 56.2 are positioned on either side of the vertical median plane PMV, approximately in the horizontal median plane PMH, at 3 o'clock and 9 o'clock. The third and fourth connections 56.3, 56.4 are positioned on either side of the vertical median plane PMV, in planes which form with the vertical median plane PMV an angle of between 25 and 65°. The fifth connection 56.5 is positioned in the vertical median plane PMV, under the engine 52. Increasing the number of connections 56.1 to 56.5 makes it possible to distribute the forces and to reduce the forces applied to each connection.

Naturally, the disclosure herein is not limited to these numbers of connections 56.1 to 56.5 and to these arrangements for the connections 56.1 to 56.5 of the engine attachment system 56. Whatever the embodiment, the engine attachment system 56 comprises at least three connections 56.1 to 56.3 each comprising a first anchoring point A rigidly secured to the primary structure 54, a second anchoring point B rigidly secured to the engine 52 and an articulation 90 connecting the first and second anchoring points A, B; at least two first anchoring points A being rigidly secured to the first right and left extensions 68.1, 68.2, the second anchoring points B being located approximately in the same second transverse plane. Positioning the second anchoring points in the same transverse plane tends to reduce the stresses in the engine 52, in particular torsional and/or bending stresses, generated as a result of the transfer of the forces between the engine 52 and the primary structure 54.

According to a preferred embodiment, the connections 56.1 to 56.5 of the engine attachment system 56 are arranged symmetrically relative to the vertical median plane PMV and have first anchoring points A rigidly secured to the first right and left extensions 68.1, 68.2. According to one arrangement, the first anchoring points A are located on the front faces F of the first right and left extensions 68.1, 68.2.

According to embodiments visible in FIGS. 14 to 17, all of the second anchoring points B are rigidly secured to the fan casing 58. Preferably, they are positioned on the outer surface F58, in the vicinity of or at the rear end 58.2 of the fan casing 58. According to embodiments visible in FIGS. 4 to 12, all of the second anchoring points B are rigidly secured to the jet engine hub 60. Preferably, they are positioned on the tubular wall 60.1 of the jet engine hub 60.

The fact that provision is not made for at least one second anchoring point B rigidly secured to the fan casing 58 and at least one second anchoring point B rigidly secured to the jet engine hub 60 makes it possible to limit the stresses between these two parts of the engine 52, as a result of the transfer of the forces between the engine 52 and the primary structure 54, and to prevent moments between the fan casing 58 and the jet engine hub 60.

The dimensions of the extensions 68.1, 68.2, 70.1, 70.2, 80.1, 80.2, of the supports 68, 70, 80 and of the reinforcements 72.1, 72.2, 82.1, 82.2 and their arrangement are adapted according to the positions of the second anchoring points B on the engine 52. In the case of second anchoring points B located on the jet engine hub 60, the first, second and third supports 68, 70, 80 take up a smaller volume than in the case of second anchoring points B located on the fan casing. Whatever the embodiment, the extensions 68.1, 68.2, 70.1, 70.2, 80.1, 80.2, the supports 68, 70, 80 and the reinforcements 72.1, 72.2, 82.1, 82.2 are dimensioned so as to be positioned under the fairing of the pylon and between the outer fairing and the inner wall of the nacelle so as not to interfere with the air streams circulating in the engine 52, between the engine 52 and the nacelle or outside the nacelle and the pylon.

According to an embodiment, the articulation 90 of each of the connections 56.1 to 56.5 of the engine attachment system 56 positioned in the second transverse plane is configured to ensure take-up of the forces in three orthogonal directions, one of which is parallel to the engine axis A52 which corresponds to the longitudinal direction X.

Figure 13:
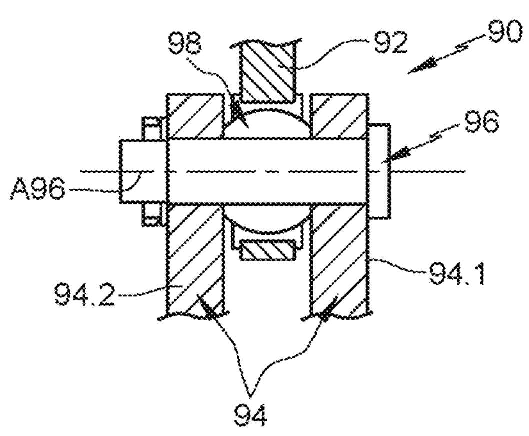
FIG. 13 is a longitudinal section through a connection of an engine attachment system depicting an embodiment of the disclosure herein.
Figure 14:
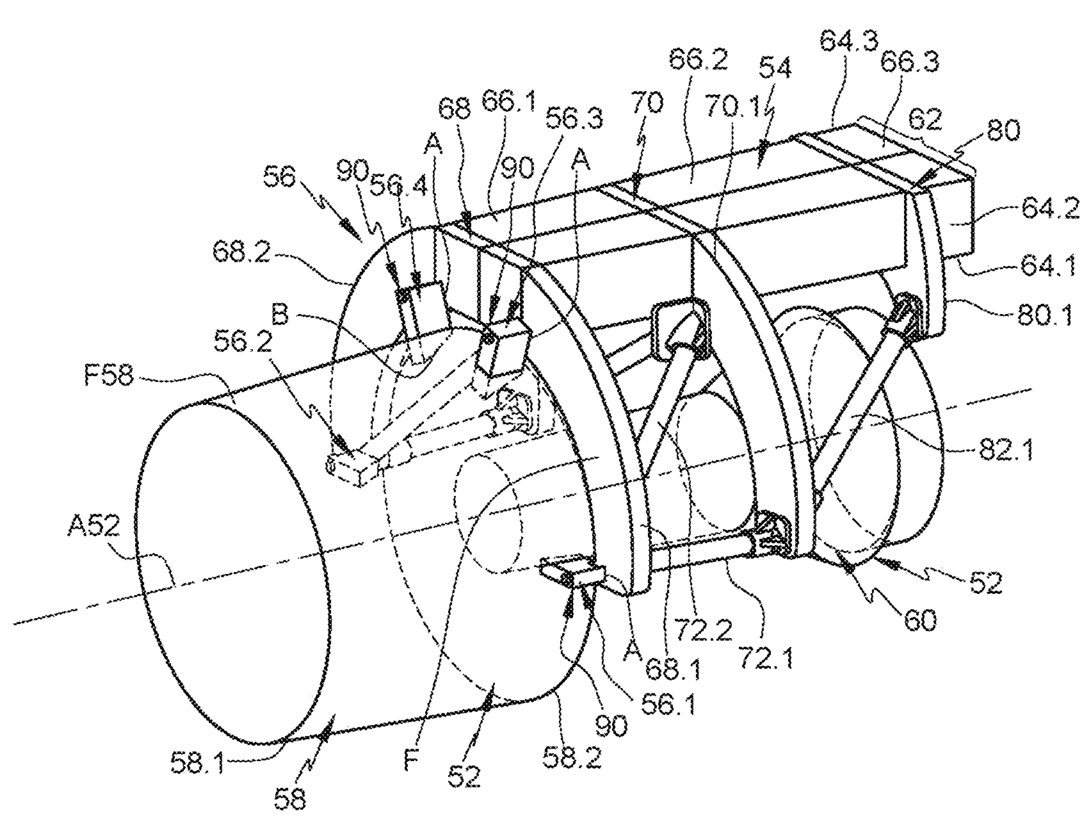
FIG. 14 is a perspective view of an engine, a pylon and an engine attachment system depicting a third embodiment of the disclosure herein.
Figure 15:
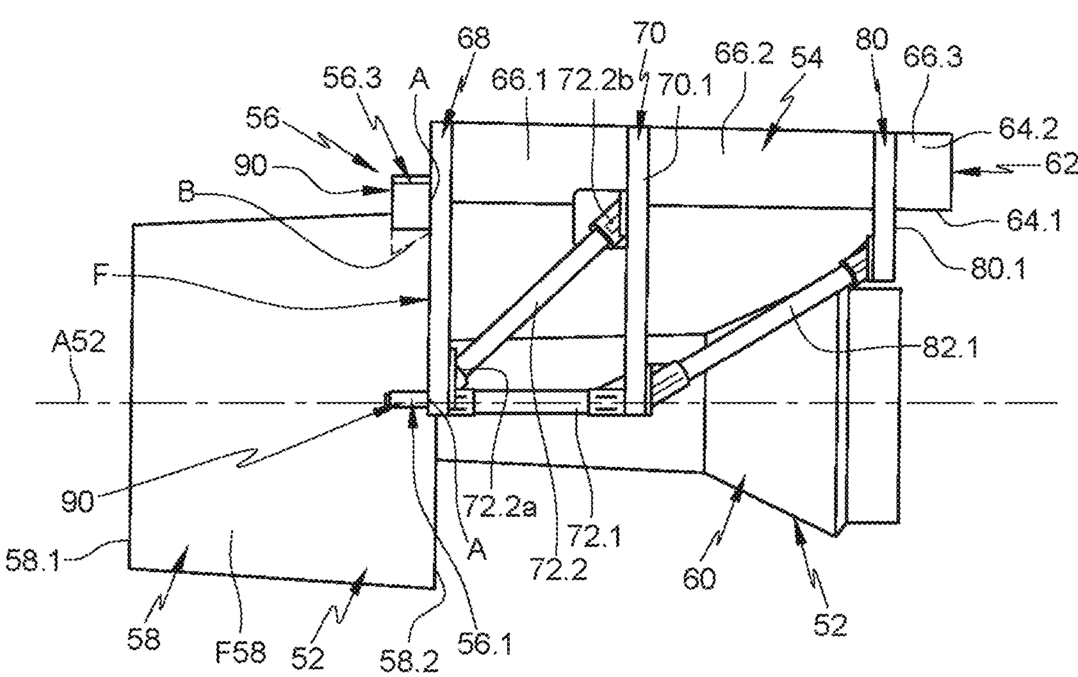
FIG. 15 is a side view of the engine, the pylon and the engine attachment system visible in FIG. 14.
Figure 16:
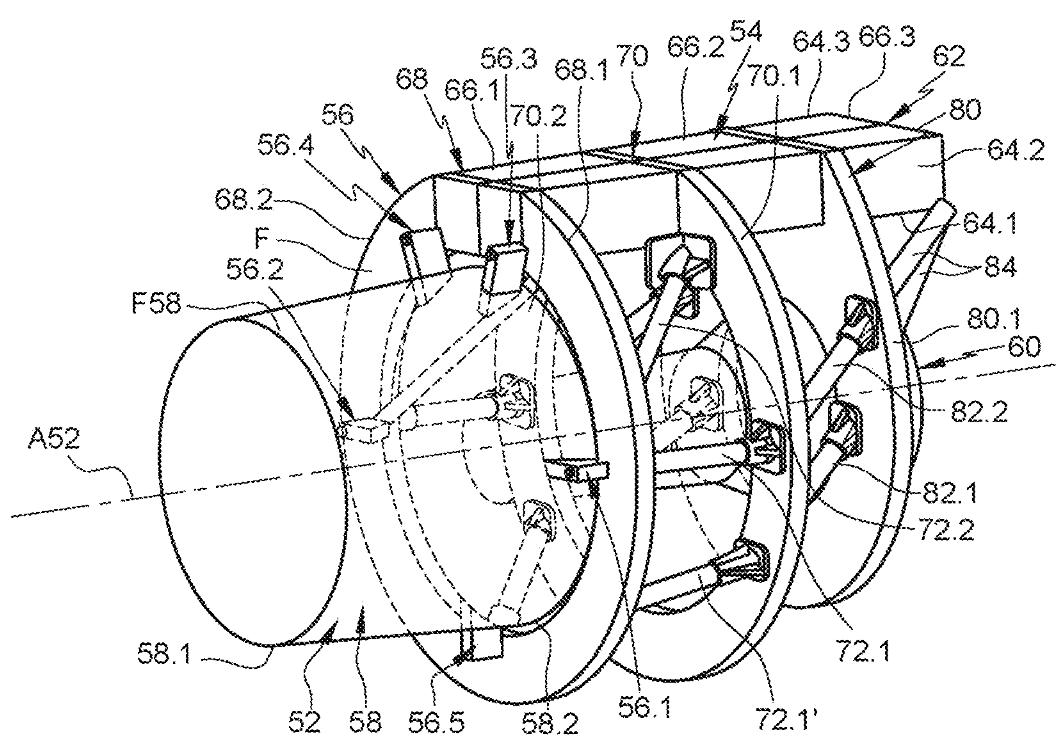
FIG. 16 is a perspective view of an engine, a pylon and an engine attachment system depicting a fourth embodiment of the disclosure herein.

According to one configuration visible in FIG. 13, the articulation 90 of each of the connections 56.1 to 56.5 of the engine attachment system 56 positioned in the second transverse plane comprises at least one pivot axis A96 substantially parallel to the longitudinal direction X. According to a preferred configuration, the articulation 90 is a ball joint.

According to an embodiment, each articulation 90 comprises a main arm 92 rigidly secured to a first element out of the engine 52 and the primary structure 54, a yoke 94 rigidly secured to a second element, different to the first element, out of the engine 52 and the primary structure 54 and a cylindrical body 96 passing through the yoke 94 and the main arm 92 and having a pivot axis A96. The yoke 94 comprises two secondary arms 94.1, 94.2 spaced not very far apart between which the main arm 92 is positioned, the main and secondary arms 92, 94.1, 94.2 being positioned in planes perpendicular to the pivot axis A96 of the cylindrical body 96. According to one configuration, this cylindrical body 96 is connected to the main arm 92 and/or to the yoke 94 by at least one pivoting connection. In the case of a ball joint 90, the cylindrical body 96 and the main arm 92 are connected by a ball joint connection 98.

For each connection 56.1 to 56.5 of the engine attachment system 56, when the main arm 92 is rigidly secured to the engine 52, the main arm 92 is connected to the engine 52 at a second anchoring point B.

For each connection 56.1 to 56.5 of the engine attachment system 56, when the yoke 94 is rigidly secured to the engine 52, the secondary arms 94.1, 94.2 are connected to the engine on either side of a second anchoring point B.

The various connections 56.1, 56.5 of the engine attachment system 56 ultimately all comprise a main arm 92 or a yoke 94 rigidly secured to the engine 52. Whatever the embodiment of the articulations 90, the second anchoring points B of the various connections 56.1, 56.5 of the engine attachment system 56 are approximately positioned in the same transverse plane.

According to a first variant, the engine 52 and the structure 54 are connected only by the connections 56.1, 56.5 of the engine attachment system 56 described above.

According to a second variant, the engine 52 and the primary structure are connected by main connections 56.1 to 56.5 of the engine attachment system 56 described above, the main connections 56.1 to 56.5 being configured to ensure transmission of the main forces between the engine 52 and the primary structure 54, in particular the forces relating to the weight of the engine 52 and to its thrust, and at least one secondary connection 100 (shown schematically in FIGS. 5 and 17) configured to ensure take-up of the forces between the engine 52 and the primary structure 54 in the event of rupture of or damage to at least one of the main connections 56.1 to 56.5 (like an emergency connection of the prior art) and/or ensure transmission of weaker secondary forces, such as inertial forces and/or stabilization forces for example, between the engine 52 and the primary structure 54 during normal operation (when no main connection 56.1 to 56.5 is damaged). By way of example, the secondary connection 100 comprises two brackets in series which are not under load during normal operation or a flexible connection which is not under tension during normal operation connecting the engine 52 and the primary structure 54.

Figure 17:
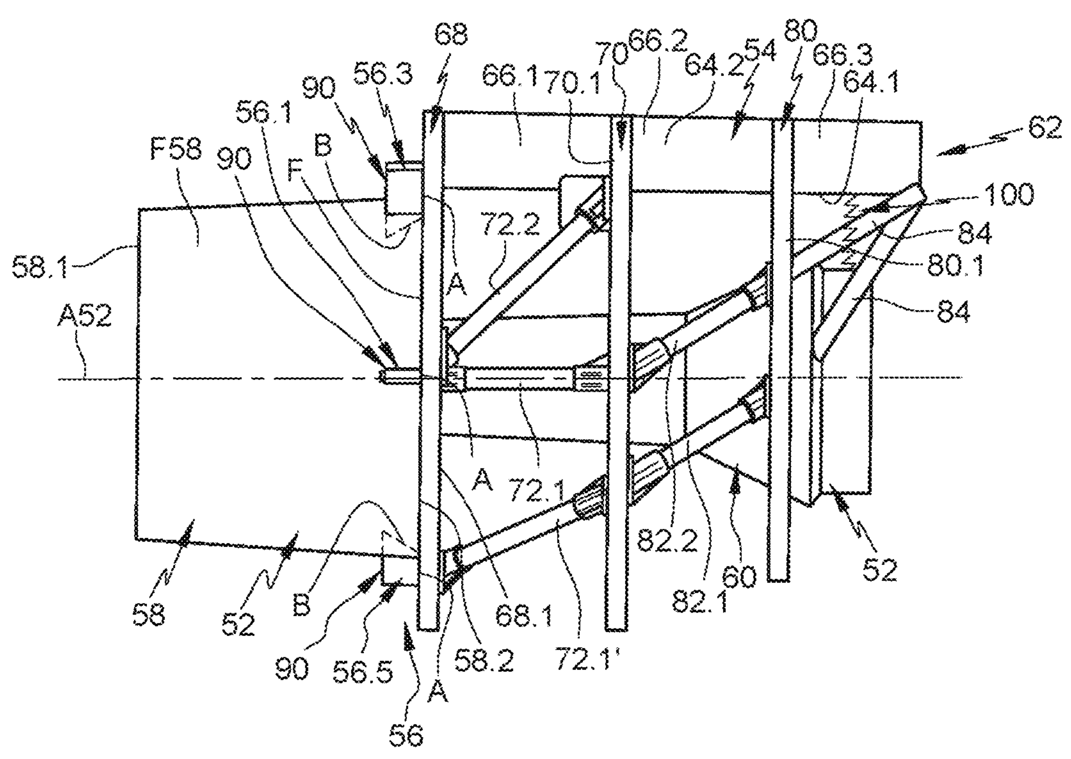
FIG. 17 is a side view of the engine, the pylon and the engine attachment system visible in FIG. 16.

According to a preferred configuration visible in FIG. 5, the secondary connection(s) 100 is (or are) located approximately in the same transverse plane as the third support 80 and/or approximately in line with the rear end of the jet engine hub 60. In this configuration, the secondary connection(s) ensure in particular take-up of the inertial loads of the engine 52 which travel via the third support 80. As a variant, the secondary connection 100 may be offset towards the rear relative to the third support 80, as shown in FIG. 17, or offset towards the front.

Whatever the embodiment, the majority or even all of the forces between the engine 52 and the primary structure 54 travel, during normal operation, via anchoring points B located on the engine 52 positioned approximately in the same transverse plane, which makes it possible to reduce in the engine 52 the stresses linked to transfer of the forces between the engine 52 and the primary structure 54 and, ultimately, to potentially simplify the design of the engine 52. According to another advantage, the disclosure herein makes it possible to reduce the number of anchoring points A and B on the primary structure 54 of the pylon and the engine 52. Furthermore, it is possible to reduce the width of the central body 62 of the primary structure 54 while placing the first and second connections 56.1, 56.2 of the engine attachment system 56 as far apart as possible.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms “comprise” or “comprising” do not exclude other elements or steps, the terms “a”, “an” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:

at least one propulsion unit comprising:

an engine which has an engine axis, as well as a vertical median plane and a horizontal median plane that pass through the engine axis;

at least one primary structure of a pylon; and at least one engine attachment system connecting the engine and the primary structure;

wherein the engine comprises a fan casing and a jet engine hub;

wherein the primary structure comprises;

a central body;

at least first and second right extensions and at least first and second left extensions, the at least first and second right extensions and the at least first and second left extensions being positioned on either side of the central body; and connected to the central body, at least one right reinforcement, which connects the at least first and second right extensions, and at least one left reinforcement, which connects the first and second left extensions;

wherein the first right extension and the first left extension are offset towards a front, in a longitudinal direction parallel to the axis of the engine, relative to the second right extension and the second left extension;

wherein the first right extension and the first left extension are positioned substantially in a first transverse plane;

the engine attachment system comprising at least three connections, each connection of the at least three connections comprising:

a first anchoring point rigidly secured to the primary structure;

a second anchoring point rigidly secured to the engine; and an articulation connecting the first anchoring point and the second anchoring point of a same connection of the at least three connections;

wherein at least two of the first anchoring points are rigidly secured to the first right extension and the first left extension; and wherein the second anchoring point of each of the at least three connections being located approximately in a second transverse plane.

2. The aircraft according to claim 1, wherein the connections of the engine attachment system are arranged symmetrically relative to the vertical median plane and have first anchoring points rigidly secured to the first right extension and the first left extension.

3. The aircraft according to claim 2, wherein:

the engine attachment system comprises first, second, third and fourth connections; and the first connection and the second connections are on either side of the vertical median plane, approximately in the horizontal median plane.

4. The aircraft according to claim 3, wherein the third connection and the fourth connection are on either side of the vertical median plane, in a plane which forms with the vertical median plane an angle of between 25° and 65°.

5. The aircraft according to claim 3, wherein the engine attachment system comprises a fifth connection positioned in the vertical median plane, under the engine.

6. The aircraft according to claim 1, wherein the articulation of each of the connections of the engine attachment system is configured to ensure take-up of forces in three orthogonal directions.

7. The aircraft according to claim 6, wherein the articulation of each of the connections of the engine attachment system is a ball joint.

8. The aircraft according to claim 1, wherein, on either side of the vertical median plane, the first and second right or left extensions are connected by at least one first substantially horizontal reinforcement, positioned approximately in the horizontal median plane, and by a second oblique reinforcement which has a front end connected to the first right or left extension and a rear end connected to the second right or left extension closer to the central body than the front end.

9. The aircraft according to claim 8, wherein, on either side of the vertical median plane, the first and second right or left extensions are connected by two first substantially horizontal reinforcements, one positioned in the horizontal median plane and another offset downwards relative to the horizontal median plane.

10. The aircraft according to claim 1, wherein:

the primary structure comprises a third right extension and a third left extensions that are on either side of the central body and offset towards the rear relative to the second right extension and the second left extension, respectively;

the at least one third right reinforcement comprises at least two third right reinforcements;

one of the at least two third right reinforcements connecting the second right extension and the third right extension and another of the at least two third left reinforcements connecting the second left extension and the third left extension.

11. The aircraft according to claim 10, wherein the primary structure comprises, on either side of the vertical median plane, at least one third oblique reinforcement, the at least one third oblique reinforcement having a front end and a rear end, wherein:

the front end is connected to the second right extension and the rear end is connected to the third right extension, closer to the central body than the front end; or the front end is connected to the second left extension and the rear end is connected to the third left extension, closer to the central body than the front end.

12. The aircraft according to claim 11, wherein:

on either side of the vertical median plane, the first and second right or left extensions are connected by at least one first substantially horizontal reinforcement, positioned approximately in the horizontal median plane, and by a second oblique reinforcement which has a front end connected to the first right or left extension and a rear end connected to the second right or left extension closer to the central body than the front end;

on either side of the vertical median plane, the first and second right or left extensions are connected by two first substantially horizontal reinforcements, one positioned in the horizontal median plane and another offset downwards relative to the horizontal median plane; and the primary structure comprises, on either side of the vertical median plane, as many third oblique reinforcement(s) as there are first horizontal reinforcement(s), the front end of each third oblique reinforcement being positioned in the extension of a first horizontal reinforcement.

13. The aircraft according to claim 1, wherein:

the first right extension and the first left extension are connected to one another and form a first support that is approximately in the first transverse plane; and/or the second right extension and the second left extension are connected to one another and form a second support that is approximately in a transverse plane; and/or the third right extension and the third left extension are connected to one another and form a third support that is approximately in a transverse plane.

14. The aircraft according to claim 13, wherein the first support and/or the second support has approximately a horseshoe or inverted U shape.

15. The aircraft according to claim 13, wherein the first support and/or the second support has an approximately annular shape configured to surround the engine.

16. The aircraft according to claim 15, wherein the first support and the second support each comprise several parts connected to one another removably, configured to position the engine in the annular shape.

17. The aircraft according to claim 1, wherein all of the second anchoring points are rigidly secured to the fan casing.

18. The aircraft according to claim 1, wherein all of the second anchoring points are rigidly secured to the jet engine hub.

19. The aircraft according to claim 1, wherein the engine attachment system comprises:

main connections positioned in the second transverse plane and configured to ensure transmission of main forces between the engine and the primary structure; and at least one secondary connection configured to:

ensure take-up of the main forces between the engine and the primary structure in an event of rupture of or damage to at least one of the main connections; and/or ensure transmission of weaker secondary forces between the engine and the primary structure during normal operation.

* * * * *